United States Patent
Shen et al.

(10) Patent No.: US 11,014,750 B2
(45) Date of Patent: May 25, 2021

(54) SHUTTLE FOR LOGISTICS

(71) Applicant: Wu Xi Galaxy Technology Company Limited, Wuxi (CN)

(72) Inventors: Lu Shen, Wuxi (CN); Chunguang Gu, Wuxi (CN); Yan Yang, Wuxi (CN)

(73) Assignee: WU XI GALAXY TECHNOLOGY COMPANY LIMITED, Wuxi (CN)

( * ) Notice: Subject to any disclaimer, the term of this patent is extended or adjusted under 35 U.S.C. 154(b) by 340 days.

(21) Appl. No.: 16/317,836

(22) PCT Filed: Feb. 12, 2018

(86) PCT No.: PCT/CN2018/076404
§ 371 (c)(1),
(2) Date: Jan. 15, 2019

(87) PCT Pub. No.: WO2019/104886
PCT Pub. Date: Jun. 6, 2019

(65) Prior Publication Data
US 2020/0216268 A1      Jul. 9, 2020

(30) Foreign Application Priority Data
Nov. 30, 2017   (CN) .......................... 201711232427.4

(51) Int. Cl.
*B60K 1/02*      (2006.01)
*B65G 17/00*     (2006.01)
(Continued)

(52) U.S. Cl.
CPC .............. *B65G 17/005* (2013.01); *B60K 1/02* (2013.01); *B60L 50/40* (2019.02); *B60L 50/60* (2019.02);
(Continued)

(58) Field of Classification Search
CPC ....... B65G 17/005; B60L 50/60; B60L 50/40; B60K 1/02; B60P 1/6436
See application file for complete search history.

(56) References Cited

U.S. PATENT DOCUMENTS 7,251,638 B2 *   7/2007   Fujii ..................... B62K 21/00
                                                         700/28
7,991,521 B2 *   8/2011   Stewart ................. G01C 21/00
                                                         701/23
(Continued)

FOREIGN PATENT DOCUMENTS

CN    103171851 A    6/2013
CN    104071542 A    10/2014
(Continued)

*Primary Examiner* — John D Walters
*Assistant Examiner* — James J Triggs
(74) *Attorney, Agent, or Firm* — Bayramoglu Law Offices LLC

(57) ABSTRACT

A shuttle for logistics includes a vehicle body, a supercapacitor, a straight wheel, a straight motor, a transverse wheel, a transverse motor, a synchronous belt, a position sensor, a charging contact, a lifting motor, a lifting frame, a second synchronous belt, an encoder, a PLC controller, a lifting cam, a lifting position sensor, a telescopic fork, a finger, a telescopic fork position sensor, a telescopic fork motor, an antenna, and a controller. A bottom of the vehicle body is provided with the straight wheel and the transverse wheel, and a level of the straight wheel is lower than that of the transverse wheel. The straight motor and the transverse motor are arranged on the vehicle body, respectively. The straight motor is linked to the straight wheel, and the transverse motor is linked to the transverse wheel. The supercapacitor is arranged on the vehicle body.

6 Claims, 9 Drawing Sheets

(51) Int. Cl.
*B60L 50/60* (2019.01)
*B60L 50/40* (2019.01)
*B60P 1/64* (2006.01)

(52) U.S. Cl.
CPC ......... *B60P 1/6436* (2013.01); *B60L 2200/36* (2013.01)

(56) References Cited

U.S. PATENT DOCUMENTS

| | | | |
|---|---|---|---|
| 9,002,581 B2 * | 4/2015 | Castaneda | B62D 6/001 |
| | | | 701/41 |
| 9,632,504 B1 * | 4/2017 | Watts | G05D 1/0231 |
| 10,683,169 B2 * | 6/2020 | Sullivan | B65G 1/0492 |
| 2008/0199292 A1 * | 8/2008 | Gatteschi | B66F 9/063 |
| | | | 414/607 |
| 2011/0303748 A1 * | 12/2011 | Lemma | G06K 7/1456 |
| | | | 235/454 |
| 2011/0320074 A1 * | 12/2011 | Erlston | B60L 50/16 |
| | | | 701/22 |
| 2012/0189416 A1 * | 7/2012 | Toebes | B65G 1/0492 |
| | | | 414/509 |
| 2013/0333342 A1 * | 12/2013 | Keski-Luopa | A01D 69/02 |
| | | | 56/10.2 A |
| 2016/0132059 A1 * | 5/2016 | Mason | G05D 1/0246 |
| | | | 701/28 |
| 2016/0209847 A1 * | 7/2016 | Kuegle | G05D 1/024 |
| 2016/0231751 A1 * | 8/2016 | Mecklinger | B60P 1/02 |

FOREIGN PATENT DOCUMENTS

| | | |
|---|---|---|
| CN | 105858030 A | 8/2016 |
| EP | 2734460 A1 | 5/2014 |
| WO | 2015131924 A1 | 9/2015 |

* cited by examiner

SHUTTLE FOR LOGISTICS

CROSS REFERENCE TO RELATED APPLICATIONS

This application is the national phase entry of International Application PCT/GN2018/076404, filed on Feb. 12, 2018, which is based upon and claims priority to Chinese Patent Application No. 201711232427.4, filed on Nov. 30, 2017, the entire contents of which are incorporated herein by reference.

TECHNICAL FIELD

The present invention relates to the technical field of shuttle for freight transportation, specifically to a shuttle for logistics.

BACKGROUND

Shuttle is used for storing, loading and unloading of goods. For example, the shuttle may be used to carry goods packaged by logistics-specific containers, cartons, etc., meanwhile, the shuttle may be used to move goods in or out of various horizontal levels of storage racking, and may also be used for cargo consolidation or goods sorting. Currently, most of the shuttles work by using a motor driven by electric power, hence, how to ensure effective battery life of the shuttle is a big issue. A part of the existing shuttles are charged by a manual charging method, when the shuttle runs out of power, the shuttle is charged through a plug and charger cable manually. Such charging mode has low efficiency, and is time and labor consuming; at the same time, automatic carrying and precise action are difficult to achieve due to moving and carrying mode thereof, the structure is complex, and the size is relatively large.

SUMMARY

The objective of the present invention is to provide a shuttle for logistics, which is compact in structure, convenient for disassembly and maintenance, and integrated intelligently, and may precisely realize the functions such as traveling, lifting, carrying, fault warning, etc.

The technical solution for solving the technical problems of the present invention is as follows. A shuttle for logistics includes a vehicle body, a supercapacitor, a straight wheel, a straight motor, a transverse wheel, a transverse motor, a synchronous belt, a position sensor, a charging contact, a lifting motor, a lifting frame, a second synchronous belt, an encoder, a PLC controller, a lifting cam, a lifting position sensor, a telescopic fork, a finger, a telescopic fork position sensor, a telescopic fork motor, an antenna, and a controller. A bottom of the vehicle body is provided with the straight wheel and the transverse wheel, and a level of the straight wheel is lower than a level of the transverse wheel. The straight motor and the transverse motor are arranged on the vehicle body, respectively. The straight motor is linked to the straight wheel through the synchronous belt, and the transverse motor is linked to the transverse wheel through the second synchronous belt. The supercapacitor is arranged on the vehicle body, and the supercapacitor is electrically connected to the straight motor, the transverse motor, the charging contact, the lifting motor, the PLC controller, the telescopic fork motor and the controller, respectively. An edge of the vehicle body is provided with the position sensor and the charging contact. The lifting motor is arranged on the vehicle body and linked to the lifting can, the lifting cam abuts on the lifting frame, and a bottom of the lifting frame is provided with the transverse wheel. The straight wheel and the transverse wheel are respectively provided with the encoder. The telescopic fork is in sliding fit with the vehicle body, and an end of the telescopic fork is provided with the finger. The telescopic fork motor is arranged on the vehicle body and linked to the telescopic fork. The vehicle body is further provided with the telescopic fork position sensor. The signal of the PLC controller is connected to the controller, the position sensor, the encoder, the lifting position sensor, the telescopic fork position sensor, the telescopic fork motor and the antenna, respectively. The controller is electrically connected to the straight motor, the transverse motor and the lifting motor, respectively.

Preferably, a lithium battery is further included. The lithium battery is arranged on the vehicle body, and the lithium battery is electrically connected to the supercapacitor.

Preferably, a second position sensor is further included. The second position sensor is arranged on the vehicle body and on a side where the transverse wheel is located.

Preferably, a second telescopic fork sensor is further included. The second telescopic fork sensor is arranged on a sidewall of the vehicle body.

Preferably, an end of the telescopic fork is further provided with a finger position sensor, and the finger position sensor is located at an upper side and a lower side of an end of a telescopic fork rail, respectively.

The beneficial effects of the invention are as follows. The shuttle for logistics of the present invention, on one hand, has a simple and compact structure in design, and designs each mechanism of the whole machine through a modularization design to facilitate the assembly, disassembly and maintenance; at the same time, functions such as straight movements, transverse movements and precise positioning may be realized, operation such as lifting of the vehicle body, and carrying goods through the telescopic fork may be completed, which is precisely controlled, and may find a possible fault and warning timely.

Figure 1:
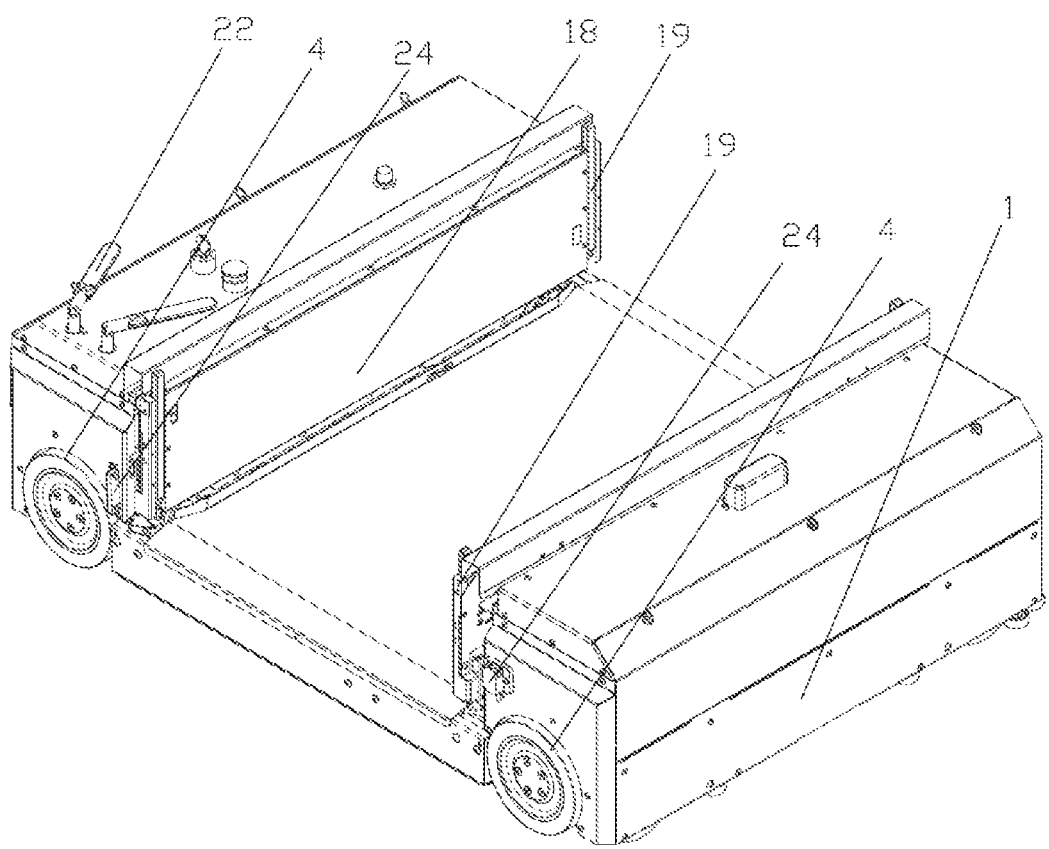
FIG. 1 is a structural diagram of the shuttle for logistics of the present invention.
Figure 2:
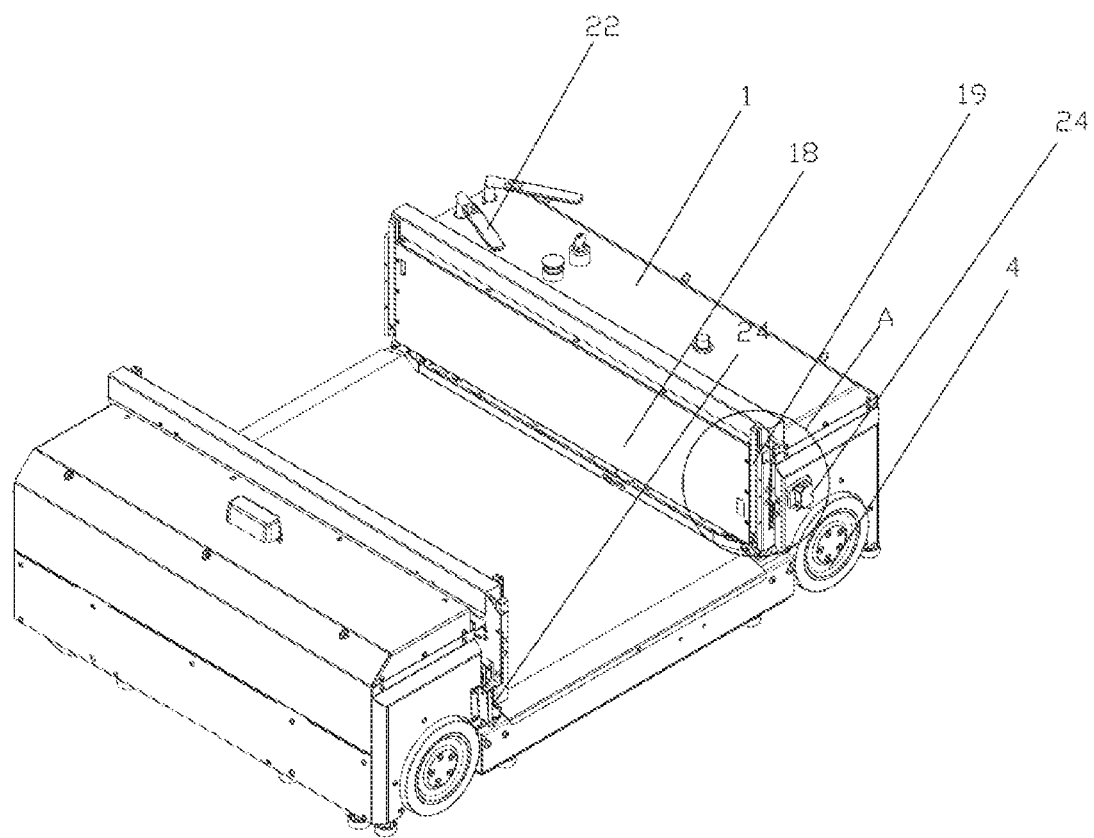
FIG. 2 is a structural diagram of the shuttle for logistics of the present invention.
Figure 3:
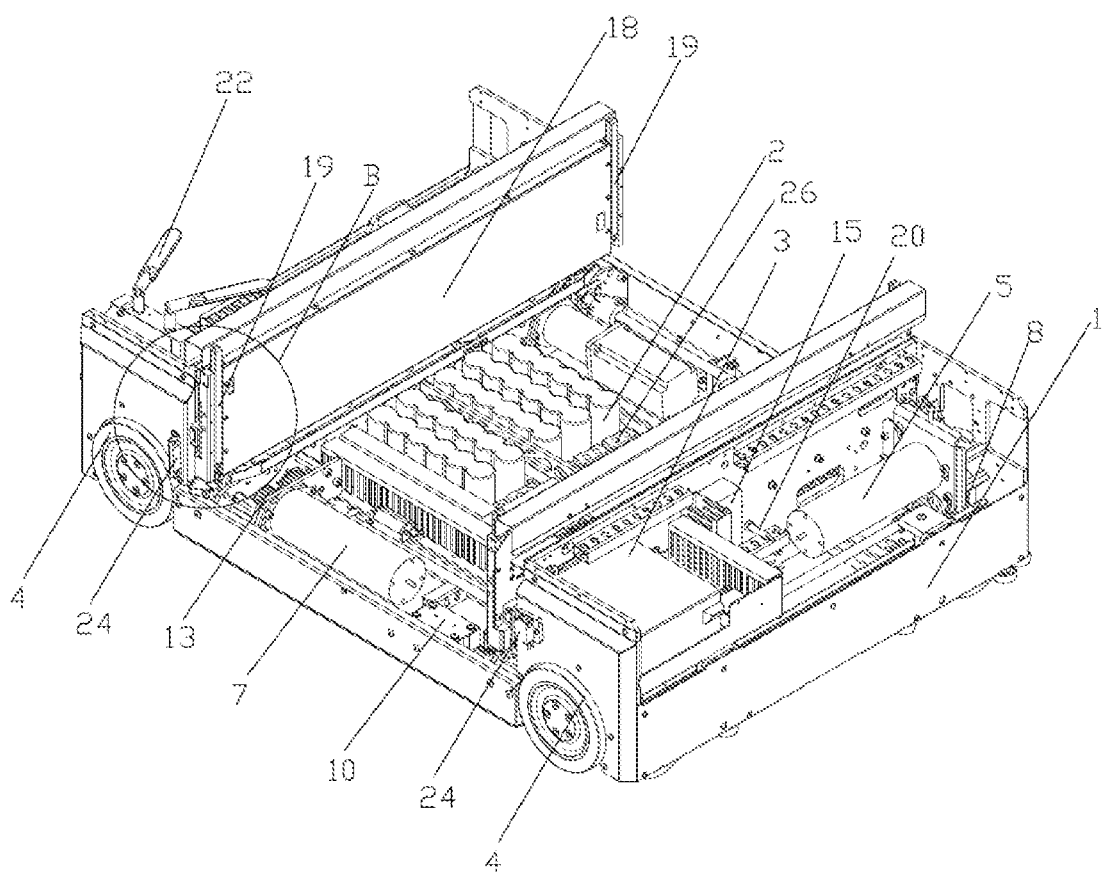
FIG. 3 is a structural diagram of the interior of the shuttle for logistics of the present invention.
Figure 4:
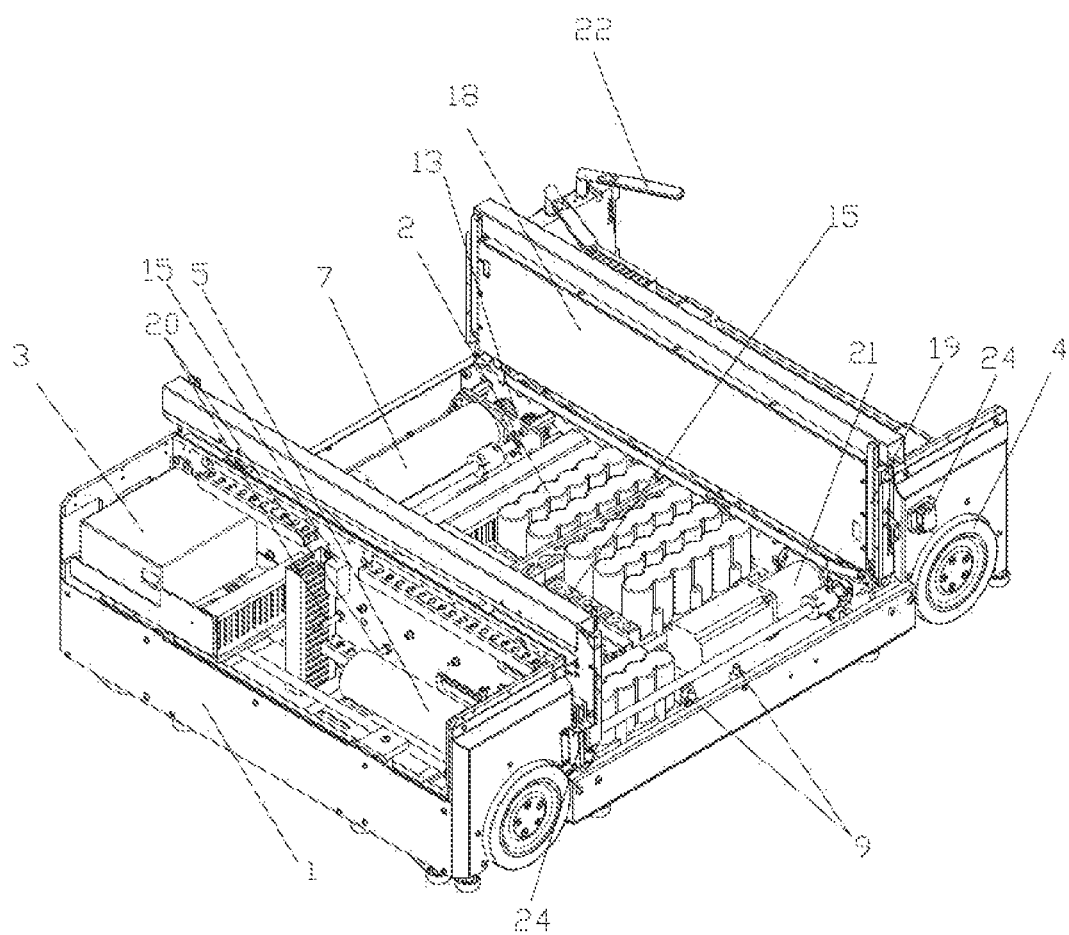
FIG. 4 is a structural diagram of the interior of the shuttle for logistics of the present invention.
Figure 5:
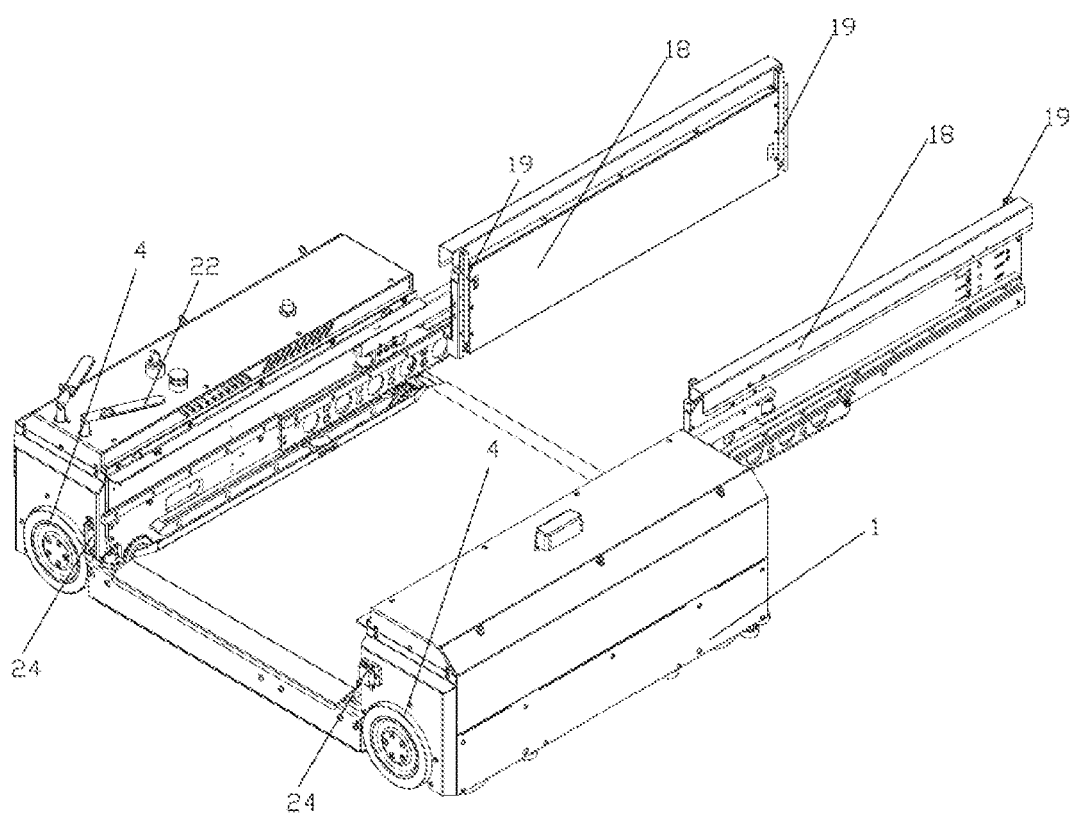
FIG. 5 is a structural diagram of the shuttle for logistics in the state of cargo canvassing of the present invention.
Figure 6:
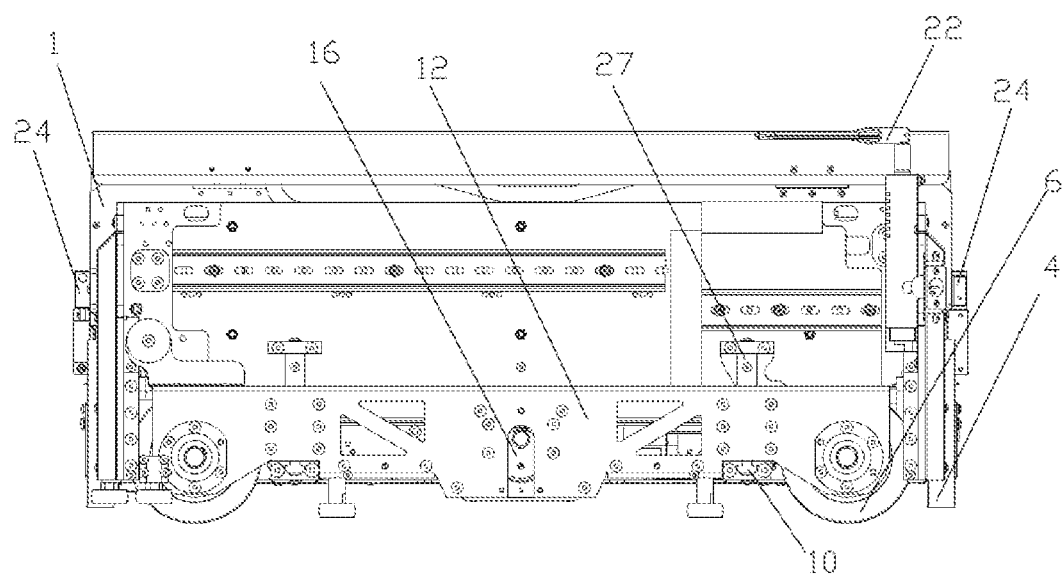
FIG. 6 is a side view of the shuttle for logistics of the present invention.
Figure 7:
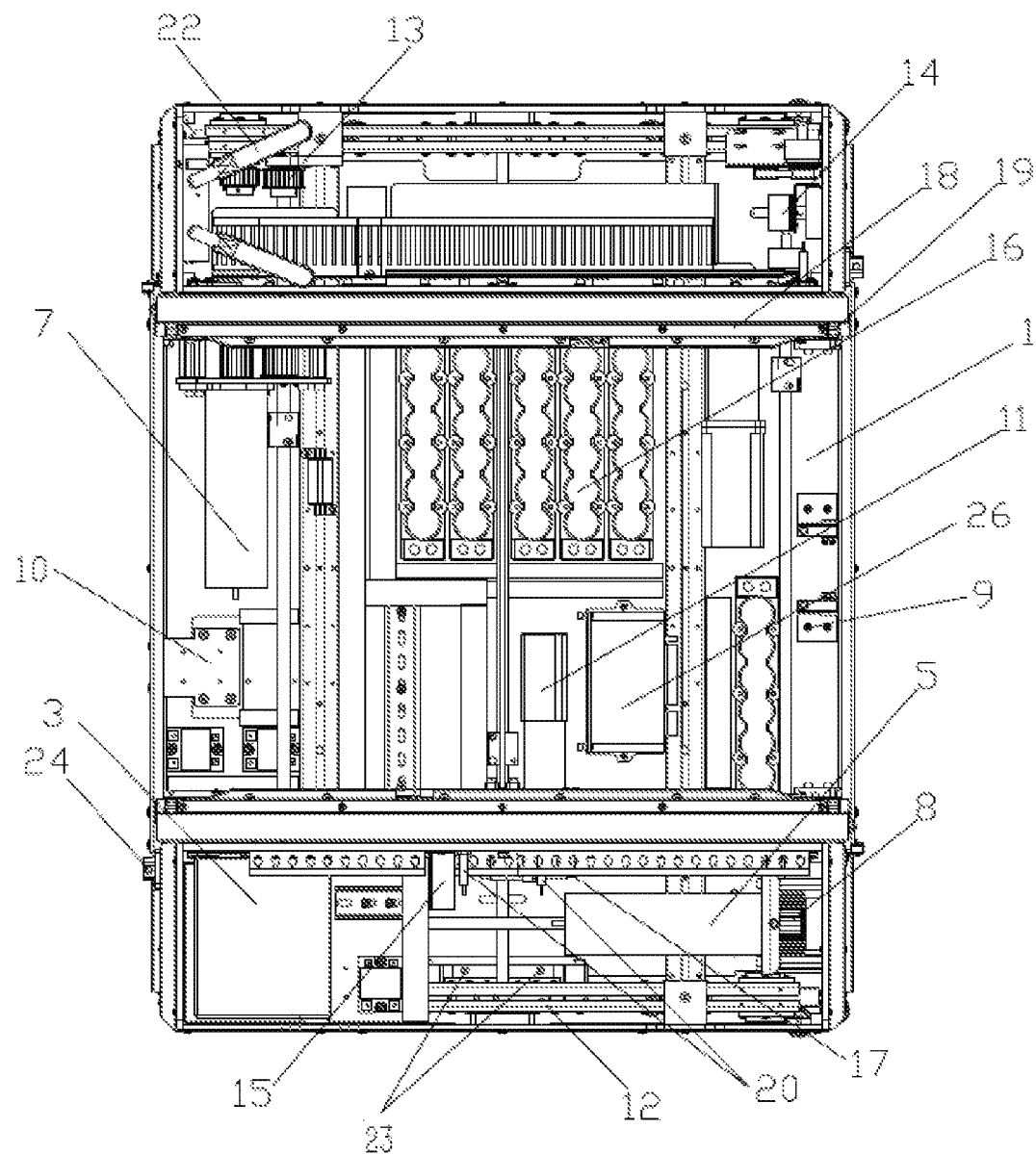
FIG. 7 is a top view of the shuttle for logistics of the present invention.
Figure 8:
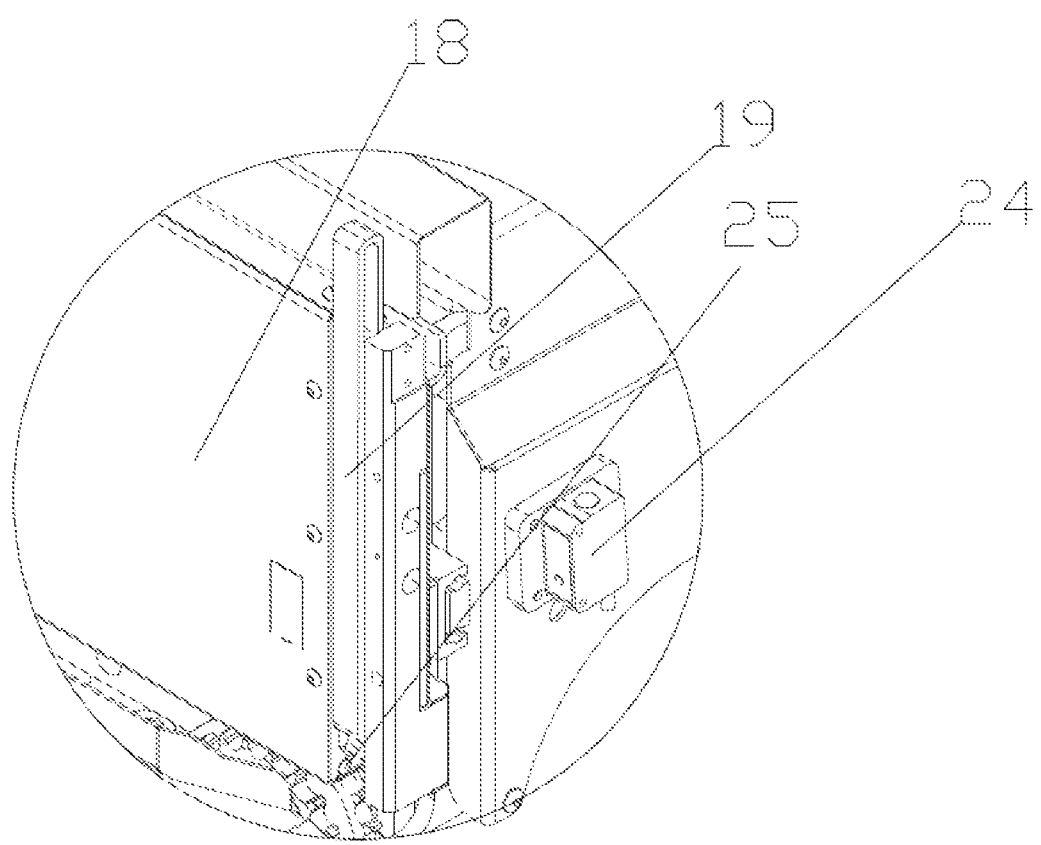
FIG. 8 is a partially enlarged view of part A of the shuttle for logistics in FIG. 2 of the present invention.
Figure 9:
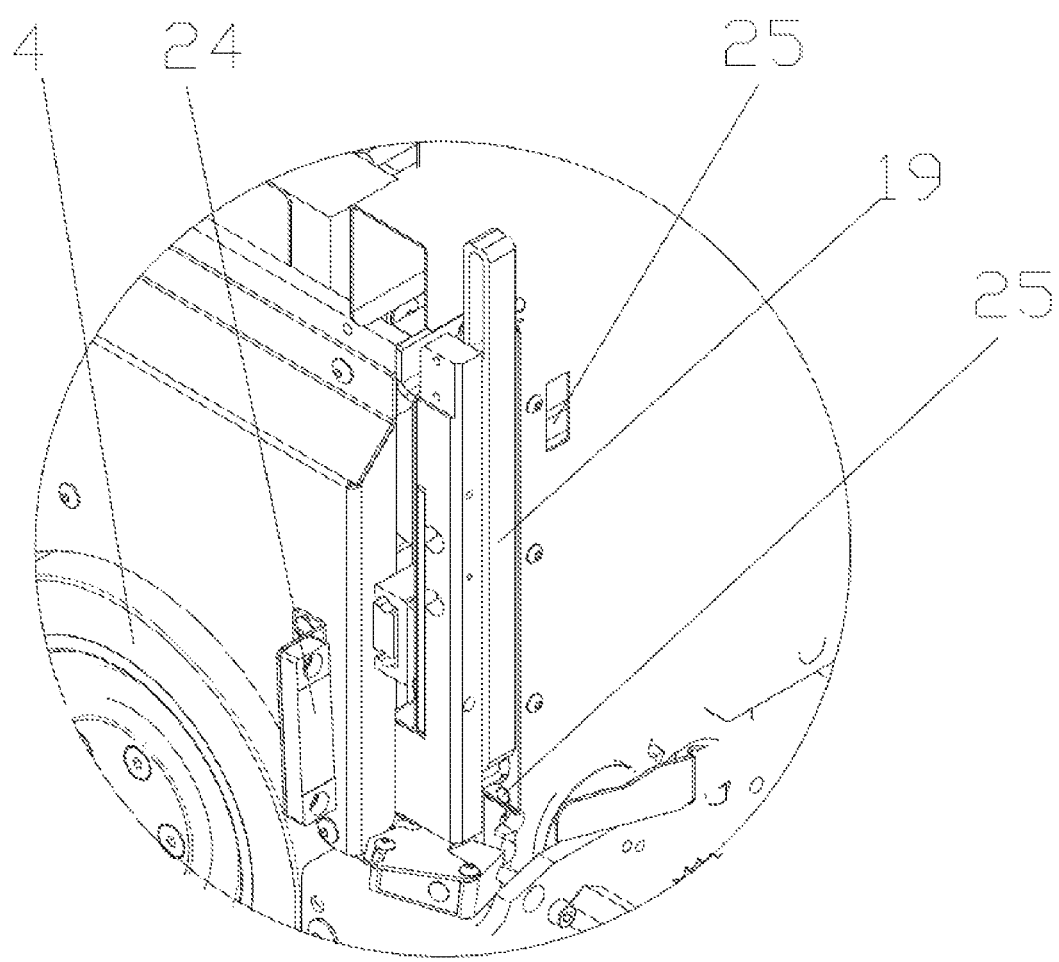
FIG. 9 is a partially enlarged view of part B of the shuttle for logistics in FIG. 3 of the present invention.

In the drawings: 1. vehicle body, 2. supercapacitor, 3. lithium battery, 4. straight wheel, 5. straight motor, 6. transverse wheel, 7. transverse motor, 8. synchronous belt, 9. position sensor, 10. charging contact, 11. lifting motor, 12. lifting frame, 13. second synthronous belt, 14. encoder, 15. PLC controller, 16. lifting cam, 17. lifting position sensor, 18. telescopic fork, 19. finger, 20. telescopic fork position sensor, 21. telescopic fork motor, 22. antenna, 23. second position sensor, 24. second telescopic fork sensor, 25. finger position sensor, 26. controller, 27. vertical guide rod.

DETAILED DESCRIPTION OF THE EMBODIMENTS

The present invention is further described in detail with reference to the drawings. The drawings are merely simplified schematic diagrams, and only used to explain the basic structure of the present invention in an exemplified way. Therefore, only components related to the present invention are shown.

As shown in the figures, a shuttle includes vehicle body 1, supercapacitor 2, straight wheel 4, straight motor 5, transverse wheel 6, transverse motor 7, synchronous belt 8, position sensor 9, charging contact 10, lifting motor 11, lifting frame 12, second synchronous belt 13, encoder 14, PLC controller 15, lifting cam 16, lifting position sensor 17, telescopic fork 18, finger 19, telescopic fork position sensor 20, telescopic fork motor 21, antenna 22, and controller 26. The bottom of the vehicle body 1 is provided with the straight wheel 4 and the transverse wheel 6, and the level of the straight wheel 4 is lower than the level of the transverse wheel 6. The straight motor 5 and the transverse motor 7 are arranged on the vehicle body 1, respectively. The straight motor 5 is linked to the straight wheel 4 through the synchronous belt 8, and the transverse motor 7 is linked to the transverse wheel 6 through the second synchronous belt 13. The supercapacitor 2 is arranged on the vehicle body 1, and the supercapacitor 2 is electrically connected to the straight motor 5, the transverse motor 7, the charging contact 10, the lifting motor 11, the PLC controller 15, the telescopic fork motor 21 and the controller 26, respectively. The edge of the vehicle body 1 is provided with the position sensor 9 and the charging contact 10. The lifting motor 11 is arranged on the vehicle body 1 and linked to the lifting cam 16, the lifting cam 16 abuts on the lifting frame 12, and the bottom of the lifting frame 12 is provided with the transverse wheel 6. The straight wheel 4 and the transverse wheel 6 are respectively provided with the encoder 14. The telescopic fork 18 is in sliding fit with the vehicle body 1, and the end of the telescopic fork 18 is provided with the finger 19. The telescopic fork motor 21 is arranged on the vehicle body 1 and linked to the telescopic fork 18. The vehicle body 1 is further provided with the telescopic fork position sensor 20. The signal of the PLC controller 15 is connected to the controller 26, the position sensor 9, the encoder 14, the lifting position sensor 17, the telescopic fork position sensor 20, the telescopic fork motor 21 and the antenna 22, respectively. The controller 26 is electrically connected to the straight motor 5, the transverse motor 7 and the lifting motor 11, respectively. The shuttle of the present invention further includes lithium battery 3, second position sensor 23 and second telescopic fork sensor 24. The lithium battery 3 is arranged on the vehicle body 1, and the lithium battery 3 is electrically connected to the supercapacitor 2. The second position sensor 23 is arranged on the vehicle body 1 and on the side where the transverse wheel 6 is located. The second telescopic fork sensor 24 is arranged on a sidewall of the vehicle body 1. The end of the telescopic fork 18 is further provided with finger position sensor 25, and the finger position sensor 25 is located at the upper side and the lower side of an end of a telescopic fork rail, respectively.

When in practical use, the vehicle body drives the straight wheel to move straight by the straight motor. Since the straight wheel is linked to the straight motor through the synchronous belt, the movement of the overall vehicle body may be ensured to be in a stable operation mode of front-wheel driving or rear-wheel driving. Meanwhile, travel distance and mode of the straight motor are controlled by the encoder and the PLC controller. When the vehicle body needs to perform transverse movement, the lifting motor drives the lifting cam to rotate, so that the lifting cam lifts the lifting frame, and due to the existing of the vertical guide rod, vertical lifting of the lifting frame may be ensured. When the transverse wheels fall down, the transverse wheels are lower than the straight wheels, and then the transverse motor drives the second synchronous belt to perform transverse operation. When the vehicle body is passing through the walking sites of the straight wheel and the transverse wheel controlled according to the PLC controller, the position sensor and the second position sensor on the vehicle body recognize the locating site on the rail, and the vehicle body stops to perform the operation of picking up goods.

When stopping for picking up the goods, the telescopic fork motor is linked to the telescopic fork through drive mechanism, so that the telescopic fork can slide from the side of the vehicle body. At the same time, in order to precisely judge whether the finger is in an extending or a retracting state, the upper end and lower end of the end of the telescopic fork rail are respectively provided with a finger position sensor, and the finger position sensor feeds back the sensor signal to the PLC controller. Meanwhile, the telescopic fork position sensor 20 is arranged on the vehicle body, and the second telescopic fork sensor 24 is arranged on the sidewall of the vehicle body 1, which can detect whether the telescopic fork is in a state of sliding out or retracting, and may feed back the state to the PLC controller, thus realizing precise positioning and feeding back the moving state of the telescopic fork.

According to the above-mentioned ideal embodiment of the present invention, through the above description, various modifications and changes can be made without departing from the scope of the technical thoughts of the present invention. The technical scope of the present invention is not limited to the content of the specification, and must be determined according to the scope of the claims.

We claim:

1. A shuttle for logistics, comprising a vehicle body, a supercapacitor, a straight wheel, a straight motor, a transverse wheel, a transverse motor, a synchronous belt, a position sensor, a charging contact, a lifting motor, a lifting frame, a second synchronous bel, an encoder, a PLC controller, a lifting cam, a lifting position sensor, a telescopic fork, a finger, a telescopic fork position sensor, a telescopic fork motor, an antenna, and a controller;

wherein a bottom of the vehicle body is provided with the straight wheel and the transverse wheel, and a level of the straight wheel is lower than a level of the transverse wheel;

the straight motor and the transverse motor are arranged on the vehicle body, respectively;

the straight motor is linked to the straight wheel through the synchronous belt, and the transverse motor is linked to the transverse wheel through the second synchronous belt, the supercapacitor is arranged on the vehicle body, and the supercapacitor is electrically connected to the straight motor, the transverse motor, the charging contact, the lifting motor, the PLC controller, the telescopic fork motor and the controller, respectively;

an edge of the vehicle body is provided with the position sensor and the charging contact;

the lifting motor is arranged on the vehicle body, and the lifting motor is linked to the lifting cam, the lifting cam abuts on the lifting frame, and a bottom of the lifting frame is provided with the transverse wheel;

the straight wheel and the transverse wheel are respectively provided with the encoder;

the telescopic fork is in a sliding fit with the vehicle body, and an end of the telescopic fork is provided with the finger;

the telescopic fork motor is arranged on the vehicle body, and the telescopic fork motor is linked to the telescopic fork;

the vehicle body is further provided with the telescopic fork position sensor;

a signal of the PLC controller is connected to the controller, the position sensor, the encoder, the lifting position sensor, the telescopic fork position sensor, the telescopic fork motor and the antenna, respectively; and the controller is electrically connected to the straight motor, the transverse motor and the lifting motor, respectively.

2. The shuttle for logistics of claim 1, further comprising a lithium battery wherein the lithium battery is arranged on the vehicle body, and the lithium battery is electrically connected to the supercapacitor.

3. The shuttle for logistics of claim 1, further comprising a second position sensor, wherein the second position sensor is arranged on a side of the vehicle body, and the transverse wheel is located on the side.

4. The shuttle for logistics of claim 1, further comprising a second telescopic fork sensor, wherein the second telescopic fork sensor is arranged on a sidewall of the vehicle body.

5. The shuttle for logistics of claim 1, wherein an end of the telescopic fork is further provided with a finger position sensor, and the finger position sensor is located at an upper side and a lower side of an end of a telescopic fork, respectively.

6. The shuttle for logistics of claim 1, further comprising a vertical guide rod, wherein the vertical guide rod passes through the lifting frame, and the vertical guide rod is connected to the vehicle body.

* * * * *